(12) United States Patent
Pingalore

(10) Patent No.: US 8,162,773 B1
(45) Date of Patent: *Apr. 24, 2012

(54) GOLF PUTTING ACCESSORY

(76) Inventor: Michael Pingalore, Belle Plaine, MN (US)

(*) Notice: Subject to any disclaimer, the term of this patent is extended or adjusted under 35 U.S.C. 154(b) by 34 days.

This patent is subject to a terminal disclaimer.

(21) Appl. No.: 12/695,324

(22) Filed: Jan. 28, 2010

(51) Int. Cl.
*A63B 69/36* (2006.01)
*G01B 3/00* (2006.01)

(52) U.S. Cl. ........ 473/231; 473/236; 473/242; 473/249; 473/251; 473/257; 33/501; 33/508; 33/555.1

(58) Field of Classification Search .......... 473/219–256, 473/257; D21/789, 791, 753; 33/501, 58, 33/555.1, 508
See application file for complete search history.

(56) References Cited

U.S. PATENT DOCUMENTS

| | | |
|---|---|---|
| 4,116,448 A | 9/1978 | Crowe, Jr. |
| 4,139,198 A | 2/1979 | Kanavas |
| 4,323,246 A | 4/1982 | Nehrbas, Jr. |
| 4,413,824 A | 11/1983 | King et al. |
| 4,880,240 A | 11/1989 | Lewis |
| 5,160,142 A | 11/1992 | Marshall |
| 5,409,228 A | 4/1995 | Botsch |
| 5,441,270 A | 8/1995 | Williams |
| 5,465,972 A | 11/1995 | Cornett |
| 5,478,078 A | 12/1995 | Lee |
| D369,846 S | 5/1996 | Jones |
| 5,527,041 A | 6/1996 | Terry, III et al. |
| 5,544,887 A | 8/1996 | Bryant |
| 5,643,098 A | 7/1997 | Monahan et al. |
| 5,665,007 A | 9/1997 | Tatum |
| 5,755,623 A * | 5/1998 | Mizenko ................ 473/241 |
| 5,810,675 A | 9/1998 | Weathers |
| 5,846,140 A | 12/1998 | Hoburg |
| 5,957,782 A | 9/1999 | Madara |
| 6,001,024 A | 12/1999 | Van Alen, II et al. |
| RE37,519 E | 1/2002 | Densberger et al. |
| 6,435,975 B2 | 8/2002 | Middleton |
| 6,464,596 B1 | 10/2002 | Belding |
| 6,634,955 B2 | 10/2003 | Middleton |
| 6,702,688 B2 | 3/2004 | Hale |
| 6,722,999 B1 | 4/2004 | Yi |
| 6,780,119 B1 | 8/2004 | Gankas |
| 7,086,953 B2 | 8/2006 | Pinder |
| 7,153,216 B1 | 12/2006 | Pressley |
| 7,544,135 B1 | 6/2009 | Higgins |
| 7,556,569 B1 | 7/2009 | Caserta |
| 7,601,072 B2 | 10/2009 | Nelson |
| D631,523 S * | 1/2011 | Pingalore .................. D21/789 |
| 2003/0130069 A1 | 7/2003 | Baird |
| 2006/0135278 A1 | 6/2006 | Lee |
| 2006/0258474 A1 | 11/2006 | Gruenke |
| 2007/0191130 A1 | 8/2007 | Kouldus |
| 2008/0146372 A1 | 6/2008 | John |
| 2009/0118035 A1 | 5/2009 | Roenick |

* cited by examiner

*Primary Examiner* — Sebastiano Passaniti
(74) *Attorney, Agent, or Firm* — Moore & Hansen, PLLC

(57) ABSTRACT

An invertible golf putting accessory having a body with an upper surface, a lower surface and a plurality of sides. Two of the sides converge towards each other to form an apex and one of the sides is removably connectable to a face of a putter by magnetic and/or adhesive material. The body includes an aperture that is configured to receive a golf ball positioned therein. The accessory is attached to the face of a putter so that a portion of the golf ball can extend above the upper surface and another portion can extend below the lower surface. In use, a golf ball is pulled back and automatically released in a desired direction as the user extends the foreswing beyond the constraints of the aperture. The body also includes indicia on one or more of the surfaces. The indicia may be used to assist in sighting the putter.

20 Claims, 3 Drawing Sheets

GOLF PUTTING ACCESSORY

BACKGROUND

This application relates generally to golf. More particularly, this application relates to an accessory that is attachable to a putter, and which facilitates aiming and use of a putter.

The sport of golf has been a popular pastime for many years. It is a game where skill, practice and knowledge all play important rolls when learning to master the game. Good hand-eye coordination is paramount; repeated practice can improve predictability of results; and accumulated knowledge can make decisions easier to make. There are several components of golf that are generally related to the distance of a golf ball to a hole. They are the long game, the short game, and putting. Each component requires slightly different skill sets, which, though not mutually exclusive, are difficult to master equally. Of the three, putting is the most challenging and the most unforgiving. If a person does not correctly read a green and putter is incorrectly aimed, a golf ball can easily miss the cup on the first try and the person must make one or more additional putts to hole out. If a putter is not correctly held throughout the putting stroke, the golf ball can easily veer away from the cup and the person must make one or more additional putts to hole out. This can be the difference between a good golfer and a great golfer.

Usually, it takes many hours of practice in order to learn how to read a green and to putt correctly. Unfortunately, many people do not have the time or inclination to develop this skill and this ability often eludes even the most ardent practitioners of the sport.

Over the years, various devices have been developed to help train a person to become a better putter in a shorter amount of time. Some of these devices are in the form of rods or bars that guide a golf ball toward the sweet spot of a putter, while other devices take the form of ancillary striking surface. A drawback with such devices is that they only interact with a golf ball when the putter is in a forward portion of the swing. This can result in improper alignment between the arc of the putting swing, the golf ball and the aiming point on the green (this is usually the hole, but it may vary if the green is not entirely horizontal and flat). Other devices are designed to be used with only a blade style putter, which is thin and has front and rear surfaces that are parallel to each other. A drawback with many of such devices is that if a golfer's preferred putter is not a blade style, the device cannot be attached to the preferred putter. In such a situation, a person wanting to use the device would be forced to practice with a putter that that the person does not normally use during regular play. And, because the dynamics of putters vary according to their styles, the putting device would lose its effectiveness because it was not used with the person's preferred putter. Further, many of the above devices are not useable with both left and right handed putters. For example, a dedicated left-handed putting device cannot be used on a right-handed putter.

Other devices are expensive, complicated, cumbersome and difficult to use. They often have many components and require many steps to connect it to a putter. They often require ancillary mechanisms, fixtures and or jigs. A drawback with such devices is that components can become lost and damaged. In such instances, the entire device may become partially or wholly inoperable.

Still other devices are purely aiming devices such as sighting mirrors or directional indicators that a person uses to align the putter during the swing. A drawback with such devices is that they do not interact with a golf ball. Instead, they only provide assistance in aiming a putter.

The golf putting accessory of this application overcomes drawbacks associated with existing golf aiming and putting devices. It is easy to operate, invertible, allows precise positioning and significantly reduces the time needed to develop the skills needed to improve one's putting game.

SUMMARY

In one embodiment, the golf putting accessory has an upper or first surface, a lower or second surface, convergent sides, a rear, and an aperture that extends from the upper surface to the lower surface. The aperture defines an enclosure that is large enough to rollingly admit a standard-sized golf ball positioned therein, yet small enough to permit the golf ball to be guided without excessive lateral movement. The aperture is configured to directionally release the golf ball as the golf club moves through and completes a putting stroke. The rear of the accessory is configured to be positioned adjacent a golf ball striking surface of a golf club. In one embodiment, the accessory includes one or more magnets that are connected to the accessory and which are used to removably attach the accessory to a ferro-magnetic portion of a golf ball striking surface of a golf club. In another embodiment, the accessory includes adhesive material that is used to removably attach the accessory to a golf ball striking face of a club. The accessory is invertible and may include indicia on one or more surfaces that can be used to convey information to a user of the accessory, such as orienting the golf ball striking face of the golf club, ownership, sponsorship, or other indicia.

DETAILED DESCRIPTION

Figure 1:
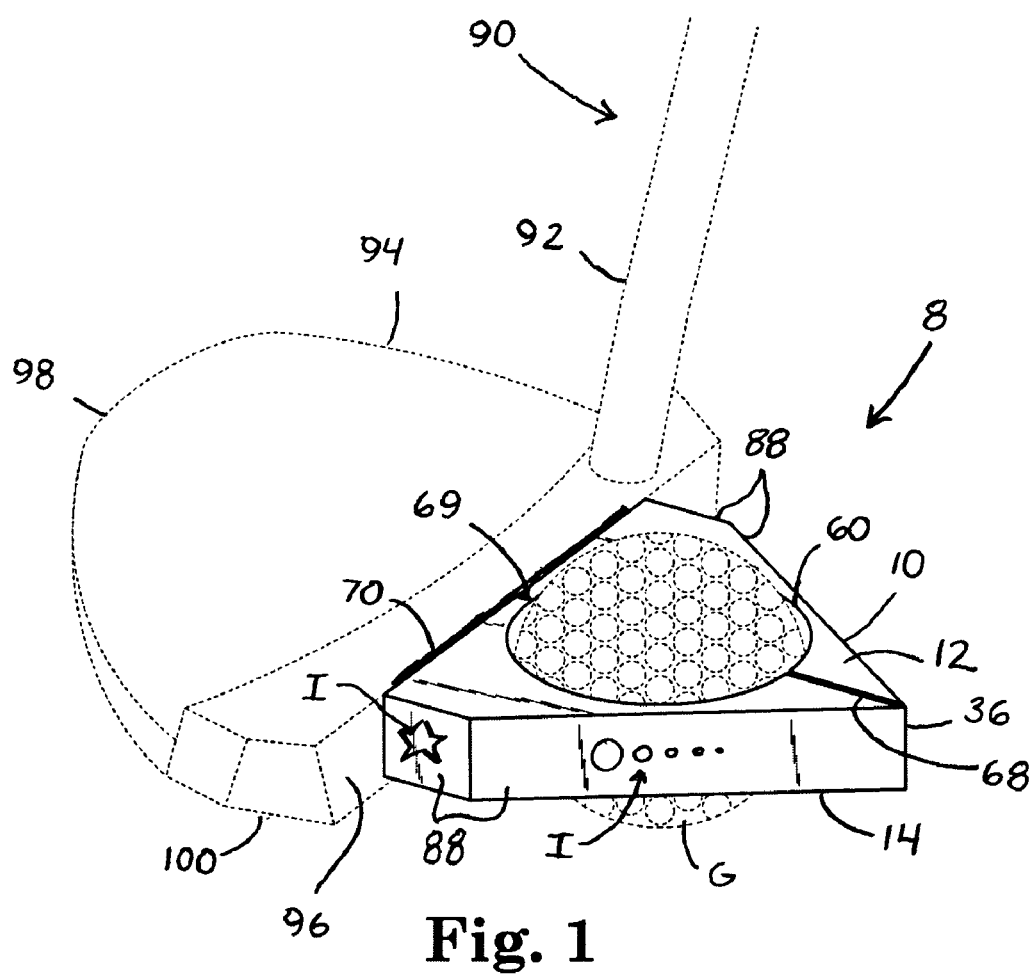
FIG. 1 is a perspective view of an embodiment of the golf putting accessory in conjunction with a golf club and a golf ball, both of which are shown in phantom.
Figure 2:
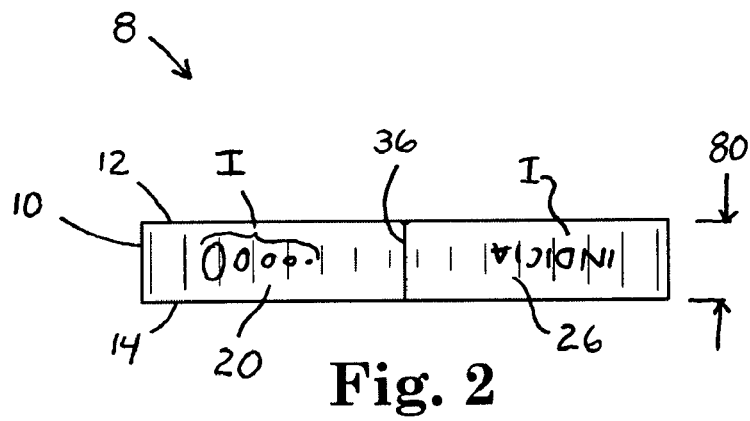
FIG. 2 is the front elevational view of the accessory of FIG. 1.
Figure 3:
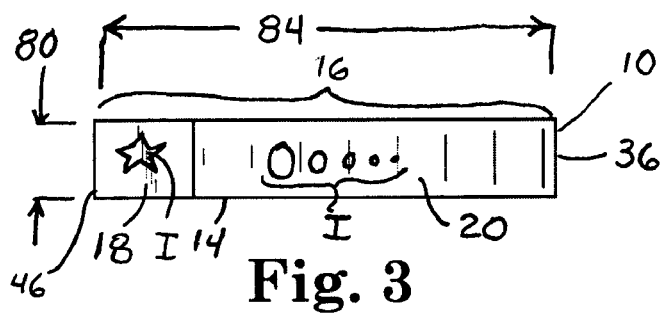
FIG. 3 is the left side elevational view of the accessory of FIG. 1.
Figure 4:
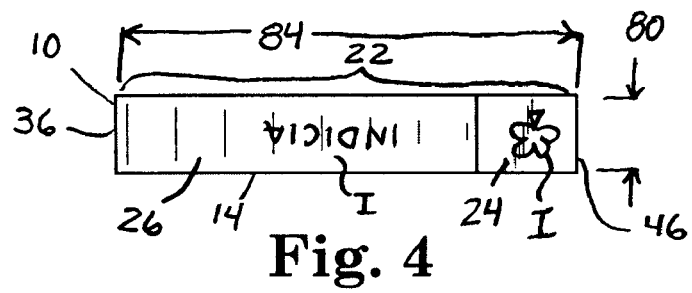
FIG. 4 is the right side elevational view of the accessory of FIG. 1.
Figure 5:
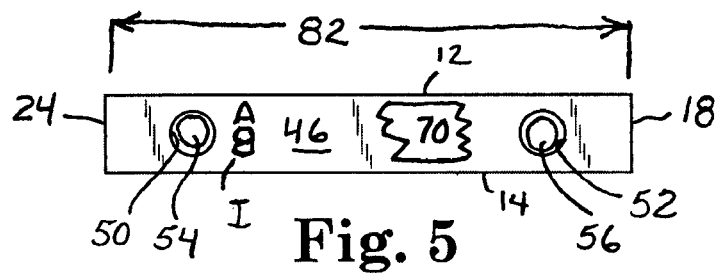
FIG. 5 is the rear elevational view of the accessory of FIG. 1.
Figure 6:
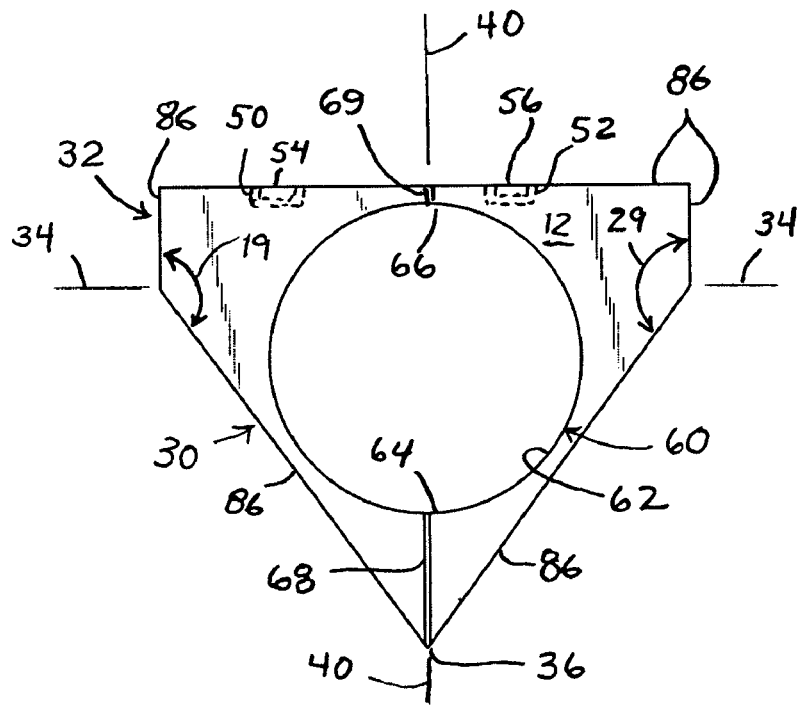
FIG. 6 is the top plan view of the accessory of FIG. 1.
Figure 7:
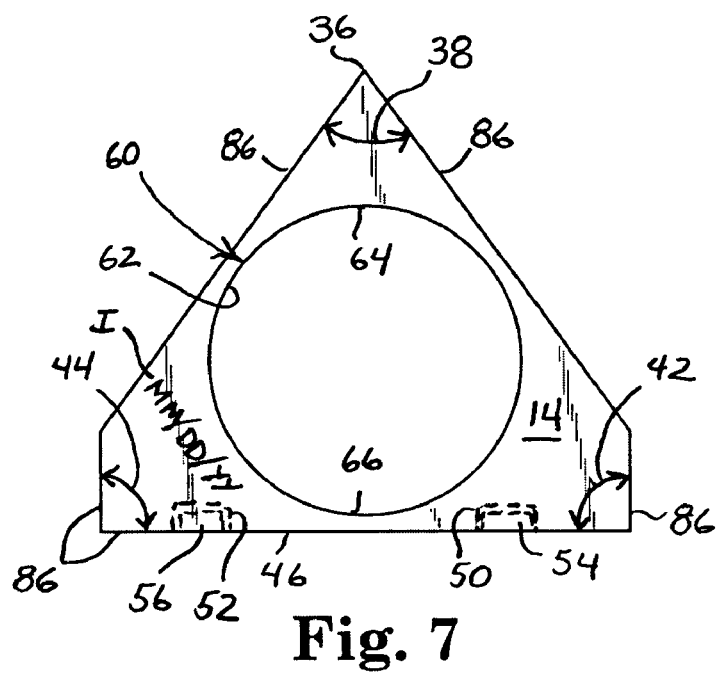
FIG. 7 is the bottom plan view of the accessory of FIG. 1.

An embodiment of a golf putting accessory is illustrated in FIGS. 1-7. Generally, the accessory 8 comprises a generally triangularly-shaped body 10 having an upper or first surface 12, a lower or second surface 14 spaced from the upper surface, sides 16, 22 that join at an apex 36, a rear face 46, and an aperture 60 that extends from the upper surface 12 to the lower surface 14.

More particularly, the upper 12 and lower 14 surfaces are generally planar and parallel with respect to each other. In addition, the upper or first and lower or second surfaces are substantially congruent and have similarly sized footprints (preferably approximately 5.25 square inches). Sides 16 and 22 are generally planar and symmetrically arranged on either side of a center line 40. Each side 16, 22 includes first and second portions 18, 20, and 24, 26, respectively, which define angles 19, 29 therebetween. The first portions 18, 24 are substantially parallel to each other, while the second portions 20, 26 converge towards each other so that they form the apex 36. The apex 36 is located on a centerline 40 that extends from the front to the rear of the accessory 8. Preferably, the sides and the rear face are substantially planar and orthogonal to the upper and lower surfaces. The sides and rear face may be provided with indicia "I", if desired.

The body 10 includes a front section 30 and a rear section 32 that join at the location of a base line 34 that extends between the junctions formed by the first and second portions of each side. Generally, the front section 30 includes the second portions 20, 26 of the sides and the apex 36, while the rear section 32 includes the first portions 18, 24 of the sides and the rear 46. The apex 36, formed and defined by second portions 20, 26 of sides 16, 22, has a preferred angle 38 of approximately 72 degrees, however, the angle 38 can range from approximately 50 degrees to approximately 85 degrees. Moreover, it is envisioned that the apex could be rounded to any extent desired without departing from the spirit and scope of the invention.

As previously mentioned, the first and second portions of each side 16 and 22 define angles 19, 29 therebetween. A preferred range of angles 19, 29 is approximately 150 to 136 degrees, and within that range, a preferred angle is approximately 145 degrees. However, the angles 19, 29 can vary from approximately 85 degrees to approximately 180 degrees without departing from the spirit and scope of the invention. Thus, the first portions of the sides could extend rearwardly in convergent directions, or the sides could essentially be completely linear so that the accessory has three apexes. The first portions 18, 24 of the respective sides 16, 22 terminate at the rear face 46, which extends therebetween. The angles 42, 44 that the first portions 18, 24 form with respect to the rear 46 are approximately 90 degrees. However, these angles can be varied by as much as plus or minus 45 degrees.

The rear face 46 has a generally planar surface that is configured so that it can be positioned adjacent a striking surface of a golf club (see, FIG. 1). In one embodiment, one or more magnets are used to attach the accessory 8 to a ferro-magnetic portion of a golf ball striking surface 96 of a golf club 90. Preferably, the rear face 46 includes one or more recesses 50, 52 that are configured to receive a like number of magnets 54, 56, respectively. The two magnets and two recesses illustrated is a preferred number only. The recesses 50, 52 are deep enough so that the magnets 54, 56 are generally flush with the surface of the rear face 46 (see, FIGS. 5, 6, and 7). The use of magnets is preferred because it allows the accessory to be attached to most golf putting faces, which are formed from ferro-magnetic material. The use of magnets is also particularly useful because many modern putters are not "blade" style putters and thus they often include a tail that is rounded or which extends rearwardly from the face in a non-parallel or irregular manner (see, for example, FIG. 1). As will be appreciated, the shape of the tail of such a putter will not affect the operation and use of the accessory 8. Preferably, such magnets are discs formed from rear-earth magnetic material such as neodymium and have a diameter of approximately 0.30 inches (8.00 mm) and a depth of approximately 0.11 inches (3.00 mm). Such magnets are commercially available at suppliers such as Master Magnetics, Inc. of Castle Rock, Colo. It is envisioned that other types and shapes of magnets may be used without departing from the spirit and scope of the invention. For example, there could be a single strip of magnetic material that is attached to the rear face 46.

In another embodiment, the accessory may be provided with adhesive material that can be used to attach the accessory to the face of the non ferro-magnetic putter, or a putter that does not have ferro-magnetic material in sufficient quantity to permit attachment with a magnet. In such instances, the accessory may be provided with adhesive material that can be used in conjunction with, or by itself to attach the accessory to the putter face. Commercially available double backed adhesive tape or double coated thin foam tape is preferred. The adhesive material may be a low to medium tack so that the material may be used once and then discarded. Alternatively, it is envisioned that other adhesive material such as "peel and stick" glue or fugitive glue may be used. Peel-and-stick glue may be obtained, for example, from Reichold Chemicals in Canada.

The aperture 60 has an interior 62 that is sized and shaped to receive a golf ball (shown in phantom in FIG. 1 as G), preferably a regulation-sized golf ball having a diameter of 1.680 inches or greater. The interior 62 has opposing golf ball contacting side surfaces, at least one front golf ball contacting surface 64 and a least one rear golf ball contacting surface 66. The golf ball contacting side surfaces prevent a golf ball from moving laterally with respect to the center line 40 of the accessory 8, and the front and rear golf ball contacting surfaces, 64, 66, respectively, pull and push a golf ball during a practice stroke. Preferably, the aperture is substantially circular, although other aperture shapes may be used. For example, the aperture may be in the form of a polygon and have a plurality of sides.

The accessory 8 has a thickness or height 80, a width 82, and a depth 84, with the width having its widest extent defined by the first portions 18, 24 of the sides 16, 22, and with the depth having its deepest extent defined by the apex 36 and the rear 46. Preferably, the accessory has a height or thickness of approximately 0.47 inches, a width of approximately 3.00 inches, and a depth of 2.75 inches. It will be understood that the height can range from approximately 0.25 inch to approximately 0.75 inch, the width can range from approximately 2.00 inches to approximately 4.00 inches, and the depth can range from approximately 2.00 inches to approximately 4.00 inches.

Each of the sides 16 and 22 and the rear face 46 have respective lengths, which when added together define a periphery 86 having a range of approximately 6.25 inches to approximately 12.00 inches. More preferably, the periphery 86 has a range of approximately 7.10 inches to approximately 10.5 inches. Even more preferably, the periphery 66 has a range of approximately 9.0 to 10.0 inches. When the apparatus 8 is attached to a golf club, the rear face 46 faces the golf ball striking surface and is not visible. However, the remaining upper and lower surfaces as well as the sides of the accessory will be visible. The visible sides collectively define a visible region 88. This visible region 88 has a total length of approximately 5.10 inches to approximately 7.50 inches. More preferably, the visible region 88 has a total length of approximately 6.00 inches to approximately 7.10 inches. It will be appreciated that all of part of this visible region may also be provided with indicia, if desired.

As mentioned above, the accessory 8 may be inverted and the first or upper surface 12 and the second or lower surface 14 may be provided with different indicia "I" so that it is able to present different views to a user. A beneficial result of such a configuration is that the amount of information that can be conveyed to a user is increased. For example, the first or upper surface may be provided with sighting indicia 68, 69 so as to assist a user with aiming the putter, while the second or lower surface may be provided with indicia "I" that provides different information such as ownership, sponsorship, or data. The sighting indicia 68, 69 are located in the front and rear sections, respectively, and they are preferably coincident with the center line 40 of the accessory. As will be appreciated, the indicia may take many forms, and can include lines, letters, numbers, coloration, etc. Moreover, the indicia may be etched, stamped, incised, drawn, painted or otherwise applied. Moreover, it will be understood that indicia "I" may also be provided for the sides and rear of the accessory.

In one embodiment, the accessory is manufactured from a methacrylate resin such as Corian® manufactured by the E.I. Du Pont Nemours and Company Corporation, Delaware. Methacrylate resin is a preferred material because it is easily obtainable, durable, and can be machined using conventional techniques. It will be appreciated, though that other materials, such as metals, woods, plastics, and the like may be used without departing from the spirit and scope of the invention. Moreover, it will also be appreciated that the accessory may be molded, cast, extruded, pultruded, laminated, sawn, sanded, etc.

The accessory may be used with any golf club putter 90 having a shaft 92, a head 94 with a golf ball striking face 96, a tail 98, and a sole 100 (as depicted in phantom in FIG. 1). In use, the accessory is positioned on the face of the putter so that the apex is in general alignment with the indexing marks of the putter, and so that the accessory is positioned about one-half inch above, and parallel to, the sole of the putter head. A golf ball may be then positioned within the aperture of the accessory so that when the putter is in a neutral position (where the sole of the putter head is substantially parallel to the surface of a green), a portion of the golf ball extends above the upper surface and another portion of the golf ball extends below the lower surface so that it rests upon the green. The putter head is then sighted using the indicia and the shape of the accessory and aligned with a predetermined "spot" on the green. As will be understood, the spot may not be the cup itself, but may be a location that is determined by "reading" the green. After the putter is positioned, a user begins the stroke by initiating a backswing. As the putter is arced rearwardly, the golf ball is pulled back by the front ball contacting surface of the aperture. It is important not to make the backswing too great, otherwise the rearmost portion of the lower surface of the accessory will be lifted above the height of the golf ball, at which point the golf ball may accidently be released from the aperture and continue to roll rearwardly. Assuming the user has not drawn the putter rearwardly too far, when the user begins the foreswing as part of a normal putting motion, the rear ball contacting surface of the aperture will contact the golf ball. Using the indicia and/or shape of the accessory, the user will aim the accessory and hence the putter in the direction of the predetermined spot. As the user continues the foreswing, the indicia and/or shape of the accessory will have the beneficial effect of reducing pronation of the wrists. As the user continues with the foreswing, the golf ball will be pushed forward and the front edge of the lower surface of the accessory will be lifted above the height of the golf ball, at which point the golf ball can be released from the confines of the aperture and will continue to roll forwardly towards the pre-selected mark as the putter stroke continues its upward arc.

The foregoing is considered as illustrative only. Furthermore, since numerous modifications and changes will readily occur to those skilled in the art, the exact construction and operation shown and described is only an example of a preferred embodiment. The invention is defined by the following claims.

What is claimed is:

1. An accessory for use with a putter having a striking surface and a sole with a surface, the accessory comprising:
a body having a first surface, a second surface spaced from and generally parallel to the first surface and a plurality of distinct sides between the first and second surfaces, the body further comprising an aperture that extends from the first surface to the second surface, the aperture configured to receive and completely encircle a golf ball, the accessory positionably attachable to the striking surface of the putter such that when the sole of the putter rests parallel to a putting green a portion of the golf ball extends above the first surface and another portion of the golf ball extends below the second surface, with both the first and second surfaces being located at or above a plane defined by the surface of the sole.

2. The accessory of claim 1, further comprising magnetic material arranged to connect the accessory to the striking surface of the putter.

3. The accessory of claim 1, further comprising adhesive material arranged to connect the accessory to the striking surface of the putter.

4. The accessory of claim 1, wherein two of the sides converge to an apex.

5. The accessory of claim 4, wherein the two sides converge to an apex that defines an angle of approximately 50 degrees to approximately 85 degrees.

6. The accessory of claim 1, wherein either the first surface or the second surface may be positioned in an upwardly facing orientation and wherein either one of the first or second surfaces further comprises indicia to facilitate aiming the face of the golf putter in a desired direction.

7. The accessory of claim 1, wherein the thickness of the body has a range of approximately 0.33 inch to approximately 0.64 inch.

8. The accessory of claim 1, wherein the first and second surfaces are generally parallel to each other.

9. The accessory of claim 1, wherein there are five sides and wherein at least one of the sides includes indicia.

10. The accessory of claim 1, wherein the aperture has a diameter of approximately 1.750 inches.

11. The accessory of claim 1, wherein the one side that is connectable to the face of the putter comprises at least one recess that is configured and arranged to receive a magnet.

12. An accessory for use with a golf club having a striking surface, the accessory comprising:
a generally triangularly shaped, planar body having a first surface, a second surface, side edges having ends that converge to an apex and ends that diverge away from each other, a rear edge that spans the divergent ends of the side edges, and an aperture that extends from the first surface to the second surface, the aperture having an interior large enough to rollingly receive a golf ball, the rear edge including a face with at least one magnet attached thereto, with the magnet having sufficient strength to permit the accessory to be removably connected to the striking surface of the golf club wherein when the accessory is attached to the striking surface of the golf club and a golf ball is positioned in the aperture, the rear edge of the accessory prevents the golf ball from contacting the striking surface of the golf club.

13. The accessory of claim 12, wherein the rear edge face further comprises a recess for receiving the magnet.

14. The accessory of claim 12, wherein the rear edge face comprises at least two magnets attached thereto, with the magnets having sufficient combined strength to permit the accessory to be removably connected to the striking surface of the golf club.

15. An accessory for use with a golf club having a striking surface, the accessory comprising:
a generally triangularly shaped, planar body having a first surface, a second surface, side edges having ends that converge to an apex and ends that diverge away from each other, a rear edge that spans the divergent ends of the side edges, and an aperture that extends from the first surface to the second surface, the aperture having an interior large enough to rollingly receive a golf ball, the rear edge including a face with adhesive material attached thereto, with the adhesive material having sufficient strength to permit the accessory to be removably connected to the striking surface of the golf club; wherein when the accessory is attached to the striking surface of the golf club and a golf ball is positioned in the aperture, the rear edge of the accessory prevents the golf ball from contacting the striking surface of the golf club.

16. The accessory of claim 15, wherein the aperture is generally circular and has a diameter that is greater than 1.680 inches.

17. An accessory for use with a golf club having a head with a golf ball striking surface, the accessory comprising:

a generally planar body having an upper surface, a lower surface spaced from and substantially parallel to the upper surface, a rear edge with opposing ends and a face, sides extending from the opposing ends of the rear edge and intersecting with each other to define a forward portion of the accessory, and an aperture extending between the upper and lower surfaces, the aperture having an opening with a closed interior surface that is large enough to receive a golf ball, the rear face attachable to the golf ball striking surface of the golf club, wherein when the accessory is attached to the striking surface of the golf club and a golf ball is positioned in the aperture, the face of the rear edge prevents the golf ball from contacting the striking surface of the golf club, wherein each of the sides has a length, and wherein the combined lengths of the sides, when added together, has a range of approximately 5.10 inches to approximately 7.50 inches.

18. The accessory of claim 17, wherein the face of the rear edge has a length, and wherein the length of the face, when added to the combined lengths of the sides, has a range of approximately 6.25 to approximately 12.0 inches.

19. The accessory of claim 17, wherein the face of the rear edge further comprises at least one magnet attached thereto, with the magnet having sufficient strength to permit the accessory to be removably connected to a ferro-magnetic striking surface of the golf club.

20. The accessory of claim 17, wherein the face of the rear edge further comprises adhesive material adhesive material arranged to connect the accessory to the striking surface of the golf club.

\* \* \* \* \*